(12) United States Patent
Zones (10) Patent No.: US 8,298,511 B2
(45) Date of Patent: Oct. 30, 2012

(54) METHOD FOR PREPARING CHA-TYPE MOLECULAR SIEVES USING NOVEL STRUCTURE DIRECTING AGENTS

(75) Inventor: Stacey I. Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 461 days.

(21) Appl. No.: 12/753,526

(22) Filed: Apr. 2, 2010

(65) Prior Publication Data
US 2010/0254895 A1 Oct. 7, 2010

Related U.S. Application Data

(60) Provisional application No. 61/166,198, filed on Apr. 2, 2009.

(51) Int. Cl.
C01B 39/48 (2006.01)
C01B 39/54 (2006.01)

(52) U.S. Cl. .................................... 423/703

(58) Field of Classification Search ............... 423/703
See application file for complete search history.

(56) References Cited

U.S. PATENT DOCUMENTS

| 4,544,538 A | 10/1985 | Zones |
| 5,653,956 A | 8/1997 | Zones |
| 2005/0136000 A1 | 6/2005 | Burton, Jr. et al. |
| 2007/0098630 A1 | 5/2007 | Chen |
| 2007/0286798 A1 | 12/2007 | Cao et al. |

OTHER PUBLICATIONS

Yan et al, "Database of open framework aluminophosphate syntheses" introduction and application (I) Sci China Ser B-Chem (Nov. 2009) vol. 52, No. 11, pp. 1734-1738.*
PCT International Preliminary Report on Patentability, PCT/US2010/029624, mailed Oct. 13, 2011.

* cited by examiner

*Primary Examiner* — David M Brunsman
(74) *Attorney, Agent, or Firm* — Michael D. Ross (57) ABSTRACT

The present invention is directed to a process for preparing CHA-type molecular sieves using at least one cationic 1,4-diazabicyclo[2.2.2]octane-based structure directing agent in conjunction with at least one cationic cyclic nitrogen-containing structure directing agent.

18 Claims, 2 Drawing Sheets

METHOD FOR PREPARING CHA-TYPE MOLECULAR SIEVES USING NOVEL STRUCTURE DIRECTING AGENTS

FIELD OF THE INVENTION

The present invention is directed to a process for preparing CHA-type molecular sieves using at least one cationic 1,4-diazabicyclo[2.2.2]octane-based structure directing agent, in conjunction with at least one cationic cyclic nitrogen-containing structure directing agent.

BACKGROUND OF THE INVENTION

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves identified by the International Zeolite Associate (IZA) as having the structure code CHA are known. For example, the molecular sieve known as SSZ-13 is a known crystalline CHA material. It is disclosed in U.S. Pat. No. 4,544,538, issued Oct. 1, 1985 to Zones. In this patent, the SSZ-13 molecular sieve is prepared in the presence of a N-alkyl-3-quinuclidinol cation, a N,N,N-trialkyl-1-adamantammonium cation and/or, and N,N,N-trialkyl-2-exoaminonorbornane cation as the SDA.

U.S. Publication No. 2007-0286798 to Cao et al., published Dec. 13, 2007, discloses the preparation of CHA-type molecular sieves using various SDAs, including a N,N,N-trimethyl-2-adamantammonium cation.

However, these SDAs are complex and costly, which makes the synthesis of CHA-type molecular sieves using these SDAs complex and costly. This cost can limit the usefulness of CHA-type molecular sieves in commercial processes. Thus, it would be desirable to find a way to reduce or eliminate the use of these costly SDAs in the synthesis of CHA-type molecular sieves.

It has now been found that CHA-type molecular sieves can be prepared using cationic 1,4-diazabicyclo[2.2.2]octane-based structure directing agents as a partial substitute for these complex and costly SDAs.

SUMMARY OF THE INVENTION

In accordance with the present invention there is provided a method of preparing CHA-type molecular sieves by contacting under crystallization conditions (1) at least one source of at least one oxide of a tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) at least one cationic 1,4-diazabicyclo[2.2.2]octane-based SDA; and (6) at least one cationic cyclic nitrogen-containing SDA.

The present invention also includes a process for preparing a CHA-type molecular sieve by:

(a) preparing a reaction mixture containing (1) at least one source of at least one oxide of a tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) at least one cationic 1,4-diazabicyclo[2.2.2]octane-based SDA; (6) at least one cationic cyclic nitrogen-containing SDA; and (7) water; and (b) maintaining the reaction mixture under conditions sufficient to form crystals of the CHA-type molecular sieve.

Where the molecular sieve formed is an intermediate material, the process of the present invention includes a further post-crystallization processing in order to achieve the target molecular sieve (e.g. by post-synthesis heteroatom lattice substitution or acid leaching).

The present invention also provides a CHA-type molecular sieve having a composition, as-synthesized and in the anhydrous state, in terms of mole ratios, as follows:

|            | Broadest   | Subembodiment |
|------------|------------|---------------|
| $TO_2/X_2O_b$ | 10-∞    | 20-∞          |
| $(Q+A)/TO_2$ | 0.02-0.08 | 0.04-0.07    |
| $M/TO_2$   | 0.01-0.30  | 0.05-0.20     | wherein:

(1) T is selected from the group consisting of tetravalent elements from Groups 4-14 of the Periodic Table, and mixtures thereof;

(2) X is selected from the group consisting of trivalent and pentavalent elements from Groups 3-13 of the Periodic Table, and mixtures thereof;

(3) stoichiometric variable b equals the valence state of compositional variable X (e.g. when X is trivalent, b=3; when X is pentavalent, b=5);

(4) M is selected from the group consisting of elements from Groups 1 and 2 of the Periodic Table;

(5) Q is at least one cationic 1,4-diazabicyclo[2.2.2]octane-based SDA; and (6) A is at least one cationic cyclic nitrogen-containing SDA.

DETAILED DESCRIPTION OF THE INVENTION

Introduction

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "molecular sieve" includes (a) intermediate and (b) final or target molecular sieves and zeolites produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

The present invention is directed to a method of making CHA-type molecular sieves using a cationic 1,4-diazabicyclo [2.2.2]octane-based structure directing agent ("SDA") in conjunction with a cationic cyclic nitrogen-containing SDA.

In one embodiment, the cationic 1,4-diazabicyclo[2.2.2] octane-based SDA is selected from the group consisting of N-alkyl-1,4-diazabicyclo[2.2.2]octane cations, N,N'-dialkyl-1,4-diazabicyclo[2.2.2]octane dications, and mixtures thereof.

N-alkyl-1,4-diazabicyclo[2.2.2]octane cations and N,N'-dialkyl-1,4-diazabicyclo[2.2.2]octane dications are represented by structures (1) and (2), respectively:

(1)

N-alkyl-1,4-diazabicyclo[2.2.2]octane cation

(2)

N,N'-dialkyl-1,4-diazabicyclo[2.2.2]octane dication wherein $R_1$ through $R_3$ are each independently selected from the group consisting of a $C_1$-$C_3$ alkyl groups. In one subembodiment, each of $R_1$-$R_3$ is a methyl group.

In another embodiment, the cationic 1,4-diazabicyclo [2.2.2]octane-based SDA is selected from the group consisting of N-alkyl-1,4-diazabicyclo[2.2.2]octane cations and N,N'-dialkyl-1,4-diazabicyclo[2.2.2]octane dications.

In one embodiment of the present invention the cationic cyclic nitrogen-containing SDA is a SDA selected from the group consisting of the following SDAs represented by structures (3) through (17), and mixtures thereof:

(3)

N,N,N,-trialkyl-1-adamantammonium cation

(4)

N,N,N,-trialkyl-2-adamantammonium cation

(5)

N-alkyl-3-quinuclidinol cation

(6)

N,N,N,-trialkyl-2-exoaminonorbornane cation

(7)

N,N,N,-trialkyl-2-edoaminonorbornane cation (8)

N,N-dialkylcyclohexylammonium cation (9)

N,N,N-trialkylcyclohexylammonium cation (10)

N,N,N-trialkyl-2-alkylcyclohexylammonium cation (11)

N,N,N-trialkyl-3-alkylcyclohexylammonium cation (12)

N,N-dialkyl-3,3-dialkylpiperidinium cation (13)

N,N-dialkyl-2-alkylpiperidinium cation (14)

1,3,3,6,6-pentaalkyl-6-azonium-bicyclo[3.2.1]octane cation (15)

2-N,N,N,-trialkylammonium-bicyclo[3.2.1]octane cation (16)

9-N,N,N,-trialkylammonium-bicyclo[3.3.1]nonane cation (17)

N,N,N-trialkyl-cis-myrtanylamine cation wherein $R_4$ through $R_{52}$ are each independently selected from the group consisting of a $C_1$-$C_3$ alkyl groups. In one subembodiment, each of $R_4$-$R_{52}$ is a methyl group. In another subembodiment, each of $R_4$-$R_{30}$ and $R_{32}$-$R_{52}$ is a methyl group, and $R_{31}$ is an ethyl group.

The SDA cations are associated with anions which may be any anion that is not detrimental to the formation of the molecular sieve. Representative anions include elements selected from Group 17 of the Periodic Table, hydroxide, acetate, sulfate, tetrafluoroborate, and carboxylate. Hydroxide is the most preferred anion. The SDA may be used to provide hydroxide ions to the reaction mixture. Thus, it is beneficial to ion-exchange, for example, a halide to hydroxide counter-ion.

Reaction Mixture

In general, the CHA-type molecular sieve is prepared by:

(a) preparing a reaction mixture containing (1) at least one source of at least one oxide of a tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) at least one cationic 1,4-diazabicyclo[2.2.2]octane-based SDA; (6) at least one cationic cyclic nitrogen-containing SDA; and (7) water; and (b) maintaining the reaction mixture under conditions sufficient to form crystals of the CHA-type molecular sieve.

Where the molecular sieve formed is an intermediate material, the process of the present invention includes a further step of synthesizing a target molecular sieve by post-synthesis techniques, such as heteroatom lattice substitution techniques and acid leaching.

The composition of the reaction mixture from which the CHA-type molecular sieve is formed, in terms of molar ratios, is identified in Table 1 below:

TABLE 1

| Reactants | Broad | Subembodiment |
|---|---|---|
| $TO_2/X_2O_a$ molar ratio | 10-∞ | 20-2,000 |
| $M/TO_2$ molar ratio | 0.05-0.35 | 0.10-0.20 |
| $Q/TO_2$ molar ratio | 0.02-0.20 | 0.10-0.20 |
| $A/TO_2$ molar ratio | 0.01-0.20 | 0.03-0.06 |
| $OH^-/TO_2$ molar ratio | 0.15-0.80 | 0.25-0.40 |
| $H_2O/TO_2$ molar ratio | 5-70 | 20-30 | wherein:

(a) compositional variables T, X, M, Q and A are as described herein above; and (b) stoichiometric variable a equals the valence state of compositional variable X (e.g., when X is trivalent, a=3; when X is pentavalent, a=5).

It should be noted that the $TO_2/X_2O_a$ molar ratio of 10-∞ includes the case where there is no $X_2O_a$, i.e., the mole ratio of $TO_2$ to $X_2O_a$ is infinity. In that case the molecular sieve is comprised of essentially all of $TO_2$.

In one embodiment, the composition of the reaction mixture from which the CHA-type molecular sieve is formed, in terms of molar ratios, is identified in Table 2 below, wherein composition variables Q and A are as described herein above.

TABLE 2

| Reactants | Broad | Subembodiment |
|---|---|---|
| $SiO_2/Al_2O_3$ molar ratio | 10-∞ | 20-50 |
| $M/SiO_2$ molar ratio | 0.05-0.35 | 0.10-0.20 |
| $Q/SiO_2$ molar ratio | 0.05-0.20 | 0.10-0.20 |
| $A/SiO_2$ molar ratio | 0.01-0.20 | 0.02-0.04 |
| $OH^-/SiO_2$ molar ratio | 0.15-0.50 | 0.25-0.35 |
| $H_2O/SiO_2$ molar ratio | 5-70 | 20-30 |

In one embodiment, the composition of the reaction mixture from which the CHA-type molecular sieve is formed, in terms of molar ratios, is identified in Table 2 above, wherein composition variables Q and A are as described herein above, and $SiO_2/Al_2O_3=\infty$.

As noted above, for each embodiment described herein, T is selected from the group consisting of elements from Groups 4-14 of the Periodic Table. In one subembodiment, T is selected from the group consisting of germanium (Ge), silicon (Si), titanium (Ti), and mixtures thereof. In another subembodiment, T is selected from the group consisting of germanium (Ge), silicon (Si), and mixtures thereof. In one subembodiment, T is Si. Sources of elements selected for composition variable T include oxides, hydroxides, acetates, oxalates, ammonium salts and sulfates of the element(s) selected for T and X. In one subembodiment, each source of the element(s) selected for composition variable T is an oxide. Where T is Si, sources useful herein for Si include fumed silica, precipitated silicates, silica hydrogel, silicic acid, colloidal silica, tetra-alkyl orthosilicates (e.g. tetraethyl orthosilicate), and silica hydroxides. Examples of silica sources useful for making high-silica forms of the CHA-type molecular sieve include fumed silica (e.g. CAB-O-SIL M-5, Cabot Corporation) and hydrated silica (e.g. HI-SIL 233, PPG Industries), and mixtures thereof. Also useful are colloidal silicas where the solid content is 30-40 wt. % $SiO_2$, and these material may be stabilized by small amounts of sodium or ammonium cations. Further, colloidal sols where aluminum is dispersed in the silica sol can be used to provide an instant $SiO_2/Al_2O_3$ ratio which is desired. Sources useful herein for Ge include germanium oxide and germanium ethoxide.

For each embodiment described herein, X is selected from the group consisting of elements from Groups 3-13 of the Periodic Table. In one subembodiment, X is selected from the group consisting of gallium (Ga), aluminum (Al), iron (Fe), boron (B), indium (In), and mixtures thereof. In another subembodiment, X is selected from the group consisting of Al, B, Fe, Ga, and mixtures thereof. In another subembodiment, X is selected from the group consisting of Al, Fe, Ga, and mixtures thereof. Sources of elements selected for optional composition variable X include oxides, hydroxides, acetates, oxalates, ammonium salts and sulfates of the element(s) selected for X. Typical sources of aluminum oxide include aluminates, alumina, and aluminum compounds such as $AlCl_3$, $Al_2(SO_4)_3$, aluminum hydroxide ($Al(OH)_3$), kaolin clays, and other zeolites. An example of the source of aluminum oxide is LZ-210 zeolite (a type of Y zeolite). Boron, gallium, and iron can be added in forms corresponding to their aluminum and silicon counterparts.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein may vary with the nature of the reaction mixture and the crystallization conditions.

Crystallization and Post-Synthesis Treatment

In practice, the molecular sieve is prepared by:
(a) preparing a reaction mixture as described herein above; and
(b) maintaining the reaction mixture under crystallization conditions sufficient to form crystals of the molecular sieve.

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 130° C. and 200° C., for a period of one to six days.

The reaction mixture may be subjected to mild stirring or agitation during the crystallization step. It will be understood by a person skilled in the art that the molecular sieves described herein may contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable T used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g. exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327 to Navrotsky and Parikh, issued Nov. 1, 2005.

The molecular sieve can subsequently be calcined in steam, air or inert gas at temperatures ranging from about 200° C. to about 800° C. for periods of time ranging from 1 to 48 hours, or more. Usually, it is desirable to remove the extra-framework cation (e.g. $H^+$) by ion-exchange or other known method and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve (e.g. silicate SSZ-13) can also be achieved by removing heteroatoms from the lattice by known techniques such as acid leaching.

The molecular sieve made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

Characterization of the Molecular Sieve

Molecular sieves made by the process of the present invention have a composition, as-synthesized and in the anhydrous state, as described in Table 3 (in terms of mole ratios), wherein compositional variables T, X, M, A and Q and stoichiometric variable b are as described herein above:

TABLE 3

|  | Broadest | Subembodiment |
|---|---|---|
| $TO_2/X_2O_b$ | 10-∞ | 20-∞ |
| $(Q + A)/TO_2$ | 0.02-0.08 | 0.04-0.07 |
| $M/TO_2$ | 0.01-0.30 | 0.05-0.20 |

In one subembodiment, the molecular sieves made by the process of the present invention have a composition, as-synthesized, as described in Table 4 (in terms of mole ratios), wherein M, Q and A are as described herein above:

TABLE 4

| $SiO_2/Al_2O_3$ | 25-40 |
|---|---|
| $(Q + A)/SiO_2$ | 0.04-0.07 |
| $M/SiO_2$ | 0.05-0.20 |

In another subembodiment, the molecular sieves made by the process of the present invention have a composition, as-synthesized, as described in Table 4 (in terms of mole ratios), wherein M, Q and A are as described herein above, and $SiO_2/Al_2O_3=\infty$.

Molecular sieves synthesized by the process of the present invention are characterized by their X-ray diffraction pattern. The X-ray diffraction pattern lines of Table 5 are representative of as-synthesized molecular sieve made in accordance with this invention. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the T/X mole ratio from sample to sample. Calcination can also cause minor shifts in the X-ray diffraction pattern. Notwithstanding these minor perturbations, the basic crystal lattice structure remains unchanged.

TABLE 5

Characteristic Peaks for As-Synthesized CHA-type Molecular Sieves

| 2 Theta[a] | d-spacing (Angstroms) | Relative Integrated Intensity (%) |
|---|---|---|
| 9.53 | 9.27 | S-VS |
| 14.00 | 6.32 | W |
| 16.17 | 5.48 | VS |
| 17.76 | 4.99 | M |
| 20.83 | 4.26 | VS |
| 24.99 | 3.56 | M |
| 26.24 | 3.39 | W |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The X-ray diffraction pattern lines of Table 6 are representative of calcined CHA-type zeolites made in accordance with this invention.

TABLE 6

Characteristic Peaks for Calcined CHA-type Molecular Sieves

| 2 Theta[a] | d-spacing (Angstroms) | Relative Integrated Intensity (%) |
|---|---|---|
| 9.56 | 9.24 | VS |
| 12.00 | 6.81 | M |
| 16.17 | 5.48 | W-M |
| 17.91 | 4.95 | W-M |
| 20.82 | 4.26 | S-VS |
| 25.17 | 3.54 | W-M |
| 30.98 | 2.88 | M |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The powder X-ray diffraction patterns presented herein were collected by standard techniques. The radiation was CuK-α radiation. The peak heights and the positions, as a function of 2θ where θ is the Bragg angle, were read from the relative intensities of the peaks, and d, the interplanar spacing in Angstroms corresponding to the recorded lines, can be calculated.

EXAMPLES

The following examples demonstrate but do not limit the present invention.

Example 1

Synthesis of N,N'-dimethyl-1,4-diazabicyclo[2.2.2]octane Hydroxide 1,4-diazabicyclo[2.2.2]octane is dissolved in methanol and an excess of methyl iodidie is added slowly being careful to make sure the reaction solution does not become too hot. The product is forming in minutes. The product after a day of stirring is collected by filtration, washed well with acetone and then ether.

A dried sample synthesized by this method analyzed well for the diquaternary SDA. The solid was next dissolved in a 5-fold mass excess of water. Then a 2.5 mass-excess of AG1-X8 resin (Bio-Rad Laboratories) resin was added in. The material was allowed to ion-exchange overnight. The product was collected and the resin was washed with another $\frac{1}{4}^{th}$ proportion (relative to the start) of water. The washing and collected material were combined and titrated to give an indication of the molarity of the SDA base.

Example 2

Synthesis of N-methyl-1,4-diazabicyclo[2.2.2]octane Hydroxide

The synthesis route described in Example 1 was repeated using ethylacetate as the solvent, and using an approximate 1/1 ratio of 1,4-diazabicyclo[2.2.2]octane and methyl iodide. The mono-quat was titrated to determine a molarity.

Example 3

81 g of a 0.45 mM solution of N-methyl-1,4-diazabicyclo[2.2.2]octane hydroxide synthesized per Example 2, 112 g of a 1 N KOH solution, 6.7 g of a solution containing 12 mM of N,N,N-trimethyl-1-adamantammonium hydroxide, 2.70 g F-2000 aluminum hydroxide (Reheis, Inc.), 70 g deionized water, 1 g SSZ-13 seed material synthesized from a similar composition batch, and 27 g CAB-O-SIL M-5 fumed silica (Cabot Corporation) were combined together in a tared 1 L Teflon liner.

The liner was then capped and placed within a Parr Steel autoclave reactor. The reaction mixture was heated at 170° C. and stirred at 72 revolutions-per-minute (RPM). After 20 hours at temperature sampling of the reaction mixture began, and a major SSZ-13 phase was observed. The reactor was shut-down at 24 hours, and the solid products were recovered from the cooled reactor. The yield of the as-made material was greater than 90% based upon the available $SiO_2$ in the reaction.

Figure 1:
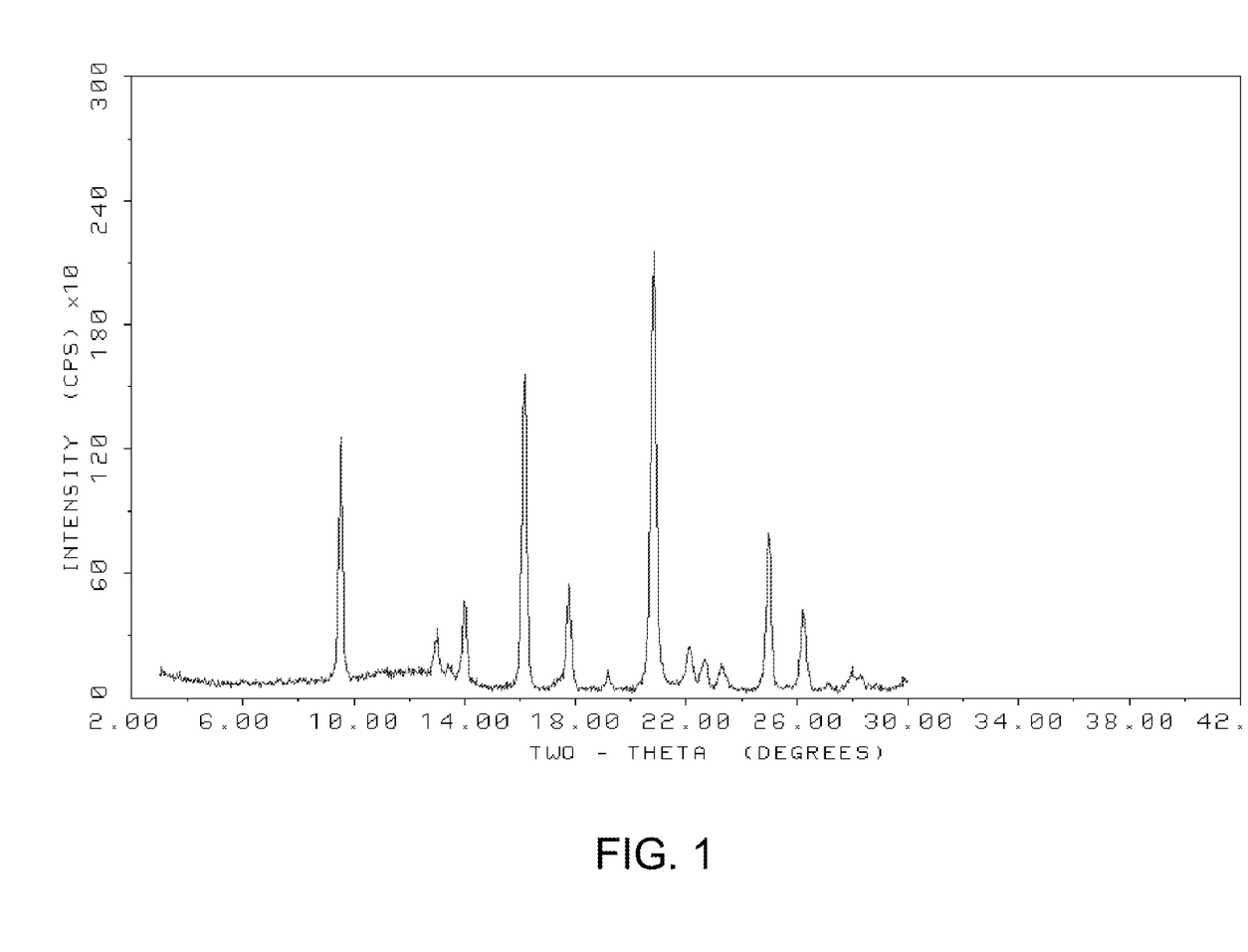
FIG. 1 shows the results of a powder X-ray diffraction (XRD) analysis of the as-synthesized molecular sieve prepared in Example 3.

The resulting molecular sieve product was analyzed by powder XRD. The resulting XRD pattern is shown in FIG. 1 and indicates the material was SSZ-13. Table 7 below shows the powder X-ray diffraction lines for the product. CHN combustion analyses of the as-made product showed a total of ~17 wt. % organic mass in the pores (13% carbon, 2% nitrogen, and 2% hydrogen) indicating that both SDAs were present in the product molecular sieve.

TABLE 7

| 2 Theta[a] | d-spacing (Angstroms) | Relative Integrated Intensity (%) |
|---|---|---|
| 9.53 | 9.27 | 56 |
| 12.99 | 6.81 | 10 |
| 14.00 | 6.32 | 18 |
| 16.17 | 5.48 | 73 |
| 17.76 | 4.99 | 23 |
| 19.18 | 4.62 | 3 |
| 20.83 | 4.26 | 100 |
| 22.11 | 4.02 | 8 |
| 22.68 | 3.92 | 6 |
| 24.99 | 3.56 | 36 |
| 26.24 | 3.39 | 18 |
| 27.98 | 3.19 | 4 |

[a] ±0.20

Figure 2:
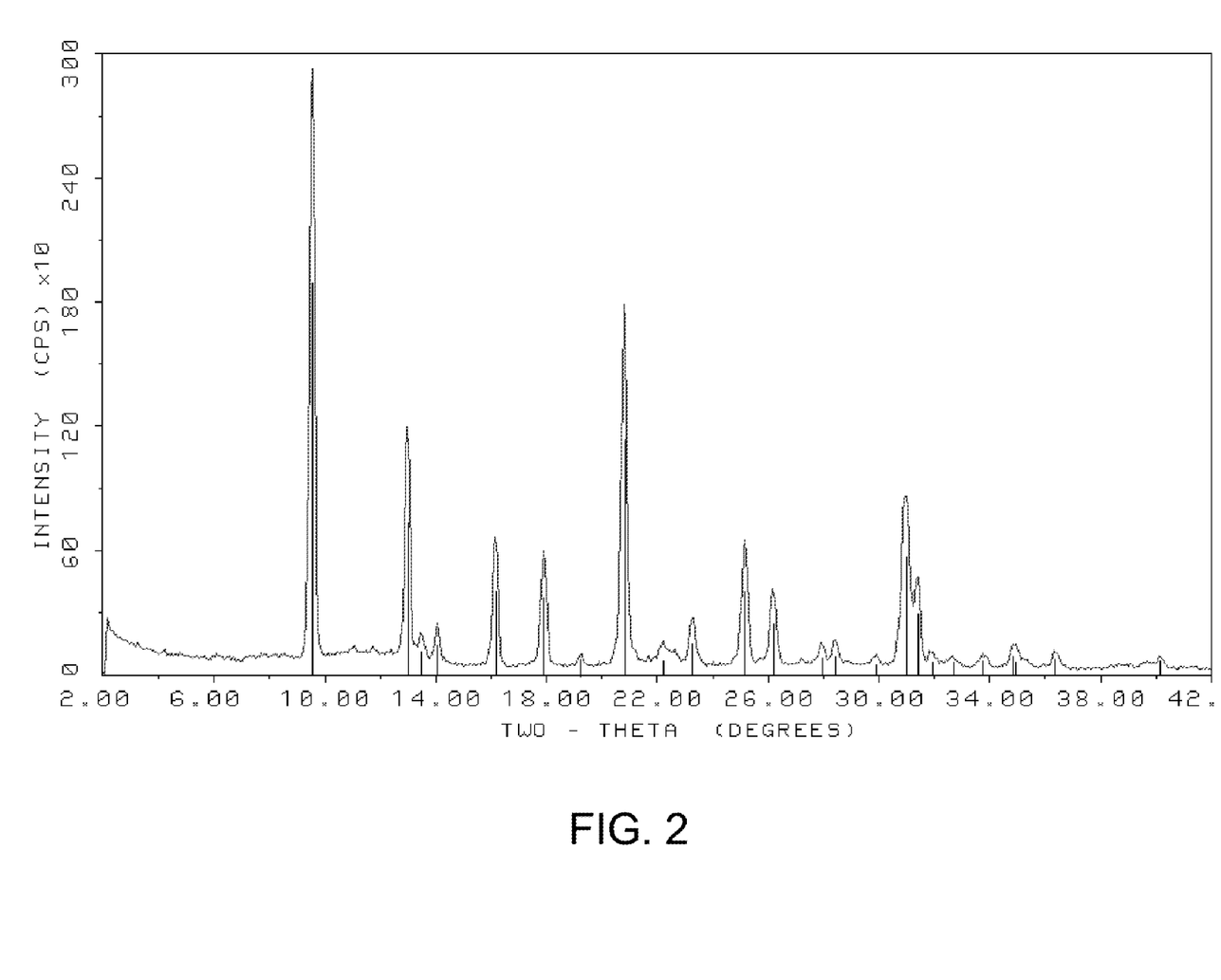
FIG. 2 shows the results of a powder XRD analysis of the calcined molecular sieve prepared in Example 3.

The resulting product was calcined inside a muffle furnace under a flow of air at >20 ft²/hour (>1.9 m²/hour) as follows: the sample was heated to 120° C. at a rate of 1° C./min and held for two hours, then heated to 540° C. at a rate of 1° C./min and held for five hours, then heated to 595° C. at a rate of 1° C./min and held for five hours, cooled and then analyzed by powder XRD. Table 8 below shows the powder X-ray diffraction lines for the product. The resulting XRD pattern is shown in FIG. 2. The vertical lines in FIG. 2 indicate where peaks for calcined SSZ-13 would be expected.

TABLE 8

| 2 Theta[a] | d-spacing (Angstroms) | Relative Integrated Intensity (%) |
|---|---|---|
| 9.56 | 9.24 | 100 |
| 12.00 | 6.81 | 37 |
| 13.49 | 6.56 | 4 |
| 14.08 | 6.28 | 7 |
| 16.17 | 5.48 | 22 |
| 17.92 | 4.95 | 19 |
| 19.24 | 4.61 | 2 |
| 20.82 | 4.26 | 60 |
| 22.22 | 3.00 | 2 |
| 23.28 | 3.82 | 7 |
| 25.17 | 3.54 | 21 |
| 26.21 | 3.40 | 13 |
| 27.95 | 3.19 | 3 |
| 28.43 | 3.14 | 4 |
| 29.89 | 2.99 | 2 |
| 30.98 | 2.88 | 29 |
| 31.40 | 2.85 | 14 |
| 31.92 | 2.80 | 2 |
| 32.70 | 2.74 | 2 |
| 33.76 | 2.65 | 1 |
| 34.86 | 2.57 | 5 |
| 34.93 | 2.57 | 2 |
| 36.38 | 2.47 | 4 |
| 40.17 | 2.24 | 3 |

[a] ±0.20

Example 4

In a Teflon Cup for a Parr 23 mL reactor, the following reagents were combined: 2.7 g 1 N NaOH, 0.6 mM N,N,N-trimethyl-1-adamantamonium hydroxide (in 1.13 g of solution), and 4.8 g of a solution containing 2.1 mM of N-methyl-1,4-diazabicyclo[2.2.2]octane hydroxide, were mixed into a clear solution. Then, 1.00 g HiSil 233 fumed silica (PPG Industries) (15 mM $SiO_2$ and $SiO_2/Al_2O_3$=200) and 0.04 g seed from Example 3 were added in. The liner was then capped and placed within a Parr steel autoclave reactor. The autoclave was then fixed in a rotating spit (43 rpm) within an oven heated at 170° C.

After two weeks the reaction product was assessed by powder XRD to be a mix of high-silica CHA (as described in U.S. Application No. US 2006/0115416 to Yuen, published Jun. 1, 2006) with also some layered material as well. It is expected that continued heating would convert the layered material (mostly $SiO_2$) into CHA with time.

Further, following the teachings in US 2006/0115416 to Yuen, use of the product of this Example as seed in a further synthesis preparation would then allow one skilled in the art to proceed towards synthesizing an all-silica CHA composition.

What is claimed is:

1. A method of preparing a CHA-type molecular sieve comprising contacting under crystallization conditions: (1) at least one source of at least one oxide of a tetravalent element; (2) optionally, one or more sources of one or more oxides selected from the group consisting of oxides of trivalent elements, pentavalent elements, and mixtures thereof; (3)

hydroxide ions; (4) at least one 1,4-diazabicyclo[2.2.2]octane-based cation; and (5) at least one cyclic nitrogen-containing cation.

2. The method of claim 1, wherein the at least one 1,4-diazabicyclo[2.2.2]octane-based cation is selected from the group consisting of N-alkyl-1,4-diazabicyclo[2.2.2]octane cations, N,N'-dialkyl-1,4-diazabicyclo[2.2.2]octane dications, and mixtures thereof.

3. The method of claim 2, wherein the at least one 1,4-diazabicyclo[2.2.2]octane-based cation is selected from the group consisting of N-alkyl-1,4-diazabicyclo[2.2.2]octane cations and N,N'-dialkyl-1,4-diazabicyclo[2.2.2]octane dications.

4. The method of claim 2, wherein the at least one 1,4-diazabicyclo[2.2.2]octane-based cation is selected from the group consisting of N-alkyl-1,4-diazabicyclo[2.2.2]octane cations.

5. The method of claim 2, wherein the at least one 1,4-diazabicyclo[2.2.2]octane-based cation is selected from the group consisting of N,N'-dialkyl-1,4-diazabicyclo[2.2.2]octane dications.

6. The method of claim 2, wherein each of the at least one 1,4-diazabicyclo[2.2.2]octane-based cation is selected from the group consisting of cations having the following structures:

wherein $R_1$ through $R_3$ are each independently selected from the group consisting of a $C_1$-$C_3$ alkyl groups.

7. The method of claim 2, wherein each of the at least one cyclic nitrogen-containing cation is selected from the group consisting of cations having the following structures:

wherein $R_4$ through $R_{52}$ are each independently selected from the group consisting of a $C_1$-$C_3$ alkyl groups.

8. The method of claim 7, wherein each of $R_4$-$R_{52}$ is a methyl group.

9. The method of claim 7, wherein each of $R_4$-$R_{30}$ and $R_{32}$-$R_{52}$ is a methyl group, and $R_{31}$ is an ethyl group.

10. The method of claim 1, wherein the molecular sieve is prepared from a reaction mixture comprising, in terms of mole ratios, the following:

| | |
|---|---|
| $TO_2/X_2O_a$ | 10-∞ |
| $M/TO_2$ | 0.05-0.35 |
| $Q/TO_2$ | 0.02-0.20 |
| $A/TO_2$ | 0.01-0.20 |
| $OH^-/TO_2$ | 0.15-0.80 |
| $H_2O/TO_2$ | 6-70 |

(1) T is selected from the group consisting of tetravalent elements from Groups 4-14 of the Periodic Table, and mixtures thereof;
(2) X is selected from the group consisting of trivalent and pentavalent elements from Groups 3-13 of the Periodic Table, and mixtures thereof;
(3) a equals the valence state of X;
(4) M is selected from the group consisting of elements from Groups 1 and 2 of the Periodic Table;
(5) Q is at least one cationic 1,4-diazabicyclo[2.2.2]octane-based SDA; and
(6) A is at least one cationic cyclic nitrogen-containing SDA.

11. The method according to claim 10, wherein T is selected from the group consisting of Ge, Si, and mixtures thereof.

12. The method according to claim 11, wherein T is Si.

13. The method according to claim 11, wherein X is selected from the group consisting of Ga, Al, Fe, B, In, and mixtures thereof.

14. The method according to claim 10, wherein X is selected from the group consisting of Ga, Al, Fe, B, In, and mixtures thereof.

15. The method of claim 10, wherein the molecular sieve is prepared from a reaction mixture comprising, in terms of mole ratios, the following:

| | |
|---|---|
| $TO_2/X_2O_a$ | 20-2,000 |
| $M/TO_2$ | 0.10-0.20 |
| $Q/TO_2$ | 0.03-0.06 |
| $A/TO_2$ | 0.02-0.05 |
| $OH^-/TO_2$ | 0.25-0.40 |
| $H_2O/TO_2$ | 20-30. |

16. The method of claim 10, wherein the molecular sieve is prepared from a reaction mixture comprising, in terms of mole ratios, the following:

| | |
|---|---|
| $SiO_2/Al_2O_3$ | 10-∞ |
| $M/SiO_2$ | 0.05-0.35 |
| $Q/SiO_2$ | 0.05-0.20 |
| $A/SiO_2$ | 0.01-0.20 |
| $OH^-/SiO_2$ | 0.15-0.50 |
| $H_2O/SiO_2$ | 5-70. |

17. The method of claim 10, wherein the molecular sieve is prepared from a reaction mixture comprising, in terms of mole ratios, the following:

| | |
|---|---|
| $SiO_2/Al_2O_3$ | 20-50 |
| $M/SiO_2$ | 0.10-0.20 |
| $Q/SiO_2$ | 0.10-0.20 |
| $A/SiO_2$ | 0.02-0.04 |
| $OH^-/SiO_2$ | 0.25-0.35 |
| $H_2O/SiO_2$ | 20-30. |

18. The method according to claim 1, wherein the molecular sieve has, after calcination, an X-ray diffraction pattern substantially as shown in the following Table:

| 2 Theta | d-spacing (Angstroms) | Relative Integrated Intensity (%) |
|---|---|---|
| 9.56 ± 0.20 | 9.24 | VS |
| 12.00 ± 0.20 | 6.81 | M |
| 16.17 ± 0.20 | 5.48 | W-M |
| 17.91 ± 0.20 | 4.95 | W-M |
| 20.82 ± 0.20 | 4.26 | S-VS |
| 25.17 ± 0.20 | 3.54 | W-M |
| 30.98 ± 0.20 | 2.88 | M. |

* * * * *